United States Patent
Brune et al.

(10) Patent No.: US 10,168,440 B2
(45) Date of Patent: Jan. 1, 2019

(54) METHOD TO DETERMINE OPTIMAL SPACING BETWEEN SEISMIC ENERGY SOURCES UTILIZING MUTUAL ADMITTANCE

(71) Applicant: APACHE CORPORATION, Houston, TX (US)

(72) Inventors: Robert H. Brune, Evergreen, CO (US); Michael Yates, Houston, TX (US)

(73) Assignee: APACHE CORPORATION, Houston, TX (US)

( * ) Notice: Subject to any disclaimer, the term of this patent is extended or adjusted under 35 U.S.C. 154(b) by 658 days.

(21) Appl. No.: 14/771,540

(22) PCT Filed: Apr. 2, 2014

(86) PCT No.: PCT/US2014/032642
§ 371 (c)(1),
(2) Date: Aug. 31, 2015

(87) PCT Pub. No.: WO2014/165574
PCT Pub. Date: Oct. 9, 2014

(65) Prior Publication Data
US 2016/0003955 A1    Jan. 7, 2016

Related U.S. Application Data

(60) Provisional application No. 61/808,238, filed on Apr. 4, 2013.

(51) Int. Cl.
*G01V 1/00*    (2006.01)

(52) U.S. Cl.
CPC .................................. *G01V 1/006* (2013.01)

(58) Field of Classification Search
CPC ....................................................... G01V 1/006
See application file for complete search history.

(56) References Cited

U.S. PATENT DOCUMENTS

| 4,184,144 A | 1/1980 | Rickenbacker |
| 4,823,326 A | 4/1989 | Ward |

(Continued)

FOREIGN PATENT DOCUMENTS

WO        2010079236 A1    7/2010

*Primary Examiner* — Paul D Lee
*Assistant Examiner* — Mark I Crohn
(74) *Attorney, Agent, or Firm* — Richard A. Fagin

(57) ABSTRACT

A method for determining an optimum spacing of seismic energy sources based on mutual admittance includes deploying a plurality of seismic energy sources along a source line, separated by a selected spacing. Seismic receivers are deployed along a receiver line orthogonal to the source line. Seismic energy is simultaneously transmitted from each of the plurality of seismic energy sources while recording signals from the seismic receivers. The transmitting and recording of signals is repeated for a plurality of different spacings between the energy sources. Seismic energy in the recorded signals is determined in separate time windows selected to represent reflected body wave signal, and source generated ground roll noise, respectively. A signal-to-noise ratio with respect to the spacing of the seismic energy sources is calculated and the optimum spacing between energy sources is selected based on the signal-to-noise ratio.

19 Claims, 3 Drawing Sheets

(56) References Cited

U.S. PATENT DOCUMENTS

| | | | |
|---|---|---|---|
| 5,511,040 A * | 4/1996 | Nyland | G01V 1/006 |
| | | | 367/40 |
| 6,754,590 B1 | 6/2004 | Moldoveanu | |
| 7,327,633 B2 | 2/2008 | Bagaini et al. | |
| 8,274,862 B2 | 9/2012 | Sallas | |
| 2010/0080081 A1* | 4/2010 | Morgan | G01V 1/003 |
| | | | 367/37 |
| 2011/0272207 A1 | 11/2011 | Meunier | |
| 2014/0241116 A1* | 8/2014 | Sallas | G01V 1/006 |
| | | | 367/14 |

\* cited by examiner

METHOD TO DETERMINE OPTIMAL SPACING BETWEEN SEISMIC ENERGY SOURCES UTILIZING MUTUAL ADMITTANCE

BACKGROUND

The present disclosure relates to seismic surveying, for example, for the exploration and production of petroleum reservoirs, and more specifically to the optimal use of seismic sources comprised of forces on the surface of the earth. Such seismic sources may include vibrators to be used in the vibroseis (swept frequency vibrator source) technique. Such seismic surveys may include, without limitation, 2D, 3D, time-lapse 4D, permanent reservoir monitoring, active hydrofracture monitoring, and vertical seismic surveys.

It has long been recognized that the use of active seismic sources for various types of seismic surveying may often involve significant amounts of deleterious source-generated-noise. This noise may include various modes of propagation associated with the surface or near surface of the earth such as refractions, Rayleigh waves, Love waves, and air-blast. The term ground-roll is often generically used to describe source generated noise associated with the surface and near surface of the earth. Ground-roll is often understood to include significant amounts of particularly Rayleigh waves.

There is a long term trend in seismic surveying for oil and gas exploration and production to try to improve signals, such as reflected body waves or other desired seismic energy, vs. noise, particularly source generated noise such as Rayleigh waves. There is a continuing need for economical and practical means to reduce this interfering source generated noise.

Those skilled in the art will recognize that elastic wave concepts often yield a more realistic mathematical and physical model of the actual subsurface structure of the earth's subsurface than simpler acoustic models. See, for example Aki and Richards (2002). Concepts such as attenuation and non-linearities are also recognized as often being important in modeling the structure and formation characteristics of the earth's subsurface Those skilled in the art will recognize that the use of the ground force concept has been widely used in Vibroseis seismic surveys for several decades. It is recognized that ground force concepts do not typically consider any aspects of the interaction between multiple seismic vibrator units. See, for example, U.S. Pat. No. 4,184,144 (Rickenbacker), Sallas (1984), and Sallas and Weber (1982).

Those skilled in the art will also recognize that there have been technical developments in Vibroseis technology to improve the tow frequency output of seismic vibrators. This technology includes displacement limits on vibrators, flow limits on vibrators, and non-linear sweep rates to emphasis low frequencies. See, for example, U.S. Pat. No. 7,327,633 B2 ("Systems and Methods for Enhancing Low-Frequency Content in Vibroseis Acquisition", C. Bagaini, et. al., Feb. 5, 2008) and U.S. Pat. No. 8,275,862 B2 ("System and Method for Determining A Frequency Sweep for Seismic Analysis", J. Sallas, Sep. 25, 2012). It is recognized that these technologies and concepts do not typically consider any aspects of the interaction between multiple seismic vibrator units.

The use of simultaneous vibrator seismic sources has been long recognized. See, for example, U.S. Pat. No. 4,823,326 ("Seismic Data Acquisition Technique Having Superposed Signals", R. M. Ward, Apr. 18, 1989). It is also recognized that more recently technologies such as Slip-Sweep have been utilized. See, for example, (Postel, et al., 2005) for a summary. It is recognized that in some very large scale 3-D Vibroseis seismic surveys, there are many individual vibrators that are sweeping in various locations utilizing sweep start times that are random relative to other vibrators. In particular it is recognized that in such surveys there are many vibrators that are individually deployed and physically separated by distances much larger than seismic wavelengths.

It is known in the art that Linear Superposition Source Array Theory may be used whenever there are two or more seismic sources deployed simultaneously at distances closer than a few seismic wavelengths.

The concept of mutual admittance for vertical forces, such as a conventional seismic vibrator unit on a half space, such as the earth's subsurface, is known in the art. Miller and Pursey (1955) disclosed analysis that showed that the partition of energy between compressional body waves, shear body waves, and Rayleigh waves varied dramatically depending on the spacing between vibrators. This was due to mutual admittance effects, and includes significant variations in energy partition beyond that predicted by linear superposition array theory. The Miller and Pursey (1954, 1955) analysis is idealized in that it is for a half-space model of the earth, for a homogeneous and isotropic earth, does not include any attenuation, and is for linear elasticity. This type analysis is still a topic of current research; see, e.g., Sanchez-Sesma (2011).

Cassand and Lavergne (1971) describe mutual admittance effects specifically in the context of vibroseis seismic surveys. For example, their FIG. 88 shows the variation of total energy, summed over all azimuths around the center of a vibrator array comprised of three vibrators deployed in an equilateral triangle, for each of the wave types: compressional body, shear body and Rayleigh surface waves (ground roll). They describe, particularly, that the amplitude of the Rayleigh wave can vary significantly as a function of the vibrator spacing.

U.S. Pat. No. 5,111,040 ("Method for Calculating the Optimum Vibrator Spacing for Ground Roll Reduction", inventor D. Nyland, granted Apr. 23, 1996) discloses a specific technique to optimize vibrator spacing, utilizing the mutual admittance concepts such as analyzed mathematically in Miller and Pursey (1955). The '040 patent discloses techniques requiring a portion of a circular-arc of receivers. The method disclosed in the '040 patent yields results showing total energy for the combination of compressional body waves, shear body waves, and ground roll (Rayleigh) waves with respect to vibrator separation. The total energy is for all wave types inseparably summed together. The total energy includes both linear superposition source array effects and mutual admittance effects, inseparably summed together.

U.S. Patent Application Publication No. 2011/0272207 A1 ("Method of Acquiring Vibroseismic Data Concerning a Zone of the Subsoil, and Seismic Exploration Method Including Such a Method", Inventor J. Meunier, Pub. Nov. 10, 2011) and International Application Publication WO 2010/079236 A1 ("Method of Acquiring Vibroseismic Data Concerning a Zone of the Subsoil, and Seismic Exploration Method Including Such a Method". Inventor J. Meunier, Pub, 15 Jul. 2010) disclose a method to reduce the effect of ground roll (Rayleigh waves) by using time shifts of seismic waves that vary non-linearly with variations of the amplitude of the vibrator ground force. Martin and Jack (1990) earlier described some of these type time shifts for body waves, using measurements in wells. It is known in the art that this technique to separate ground roll from other seismic data apparently depends on non-linear elasticity phenomena, and does not utilize mutual admittance effects.

The use of vibrator arrays with all vibrators in-line does not offer any linear superposition source array effect in the cross-line direction, orthogonal to the linear source array.

SUMMARY

A method according to one aspect for determining an optimum spacing of seismic energy sources based on mutual admittance includes deploying a plurality of seismic energy sources along a source line, separated by a selected spacing. Seismic receivers are deployed along a receiver line orthogonal to the source line. Energy is simultaneously transmitted from each of the plurality of seismic energy sources while recording signals from the seismic receivers. The transmitting and recording signals is repeated for a plurality of different spacings between the energy sources. Seismic energy in the recorded signals is determined in separate time windows selected to represent reflected body wave signal, and source generated ground roll noise, respectively. A signal-to-noise ratio with respect to the spacing of the seismic energy sources is calculated and the optimum spacing between energy sources is selected based on the signal-to-noise ratio.

Other aspects and advantages of the present disclosure will be apparent from the following description and claims.

DETAILED DESCRIPTION

Figure 1:
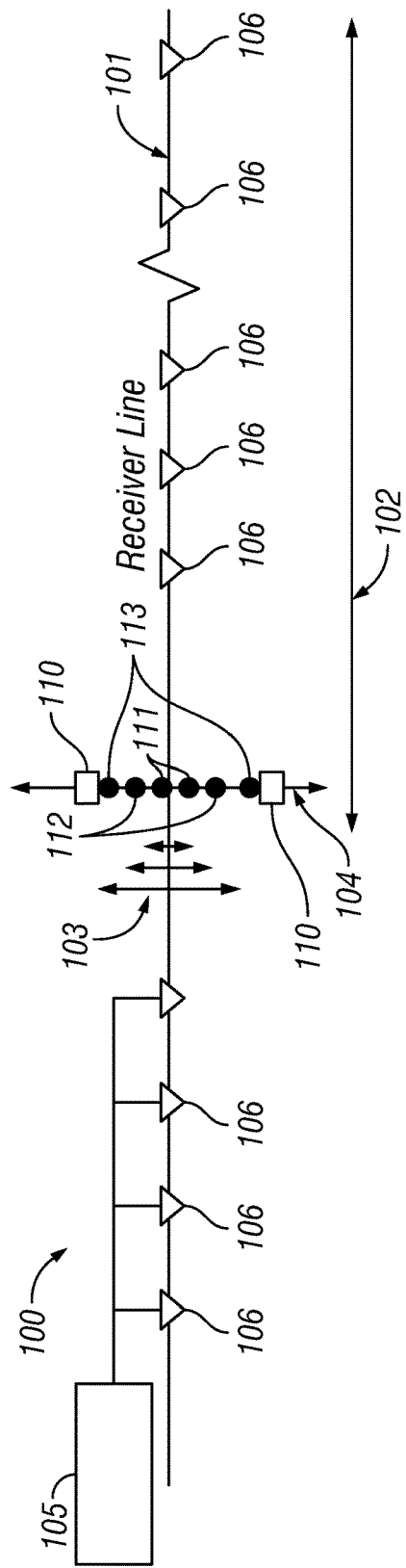
FIG. 1 is a geometric plan view of the method of determining Mutual Admittance effects between seismic vibrators separately from linear superposition source array effects.

Arrays of seismic sources may have signals generated therefrom analyzed by means of linear system theory, Fourier theory, and superposition principles. In the foregoing example techniques, the signals resulting from two seismic sources, designated A and B, emitting signals at the same time are understood to equal the sum of the signals from source A and the signals from source B, each emitted separately. Fourier analysis of seismic source spatial arrays is understood to be based on the superposition of many harmonic components to yield a real physical result.

The concept of admittance in the context of elastic or acoustic waves is that the particle velocity and a force, or pressure, are related by an admittance. This concept may be extended to two seismic sources, utilizing the concept of mutual admittance. In particular for the two example seismic vibrators, A, and B, one may consider the particle velocity at the baseplates, and the ground forces. There is also a relationship between the particle velocity for one vibrator and the ground force of the other vibrator that is determinable by the mutual admittance.

For the case of the two example vibrators, A, and B, this may be represented as:

$$\begin{bmatrix} \dot{u}_A \\ \dot{u}_B \end{bmatrix} = \begin{bmatrix} Y_{AA} & Y_{AB} \\ Y_{BA} & Y_{BB} \end{bmatrix} \begin{bmatrix} GF_A \\ GF_B \end{bmatrix} \quad (1)$$

where the terms $Y_{AB}$ and $Y_{BA}$ are mutual admittances. The time derivatives of the u vector on the left hand side of Eq. (1) represent the particle velocity for each vibrator; the GF vector on the right hand side of Eq. (1) represents the ground force for each vibrator.

If there are non-zero mutual admittance effects, then there is not a superposition principle for energy in the far field seismic wavefield. The energy observed in the far-field seismic waves for vibrators A and B operating simultaneously is not the same as the sum of the energy observed in the far-field seismic waves for vibrator A and B when each emits seismic waves at separate times.

In far-field seismic wave fields measurements of particle velocity are proportional to the square root of the far-field energy, with proportionality based on the specific admittance at the measurement point. Thus conventional measurement of particle velocity in the far-field will sense that superposition does not occur for the two vibrators A and B when there is a non-zero mutual admittance.

In electrical circuits, it is understood that mutual admittance may be determined by electrical material properties, and by geometric factors, such as the distances between adjacent coils, the number of wire turns, etc. In an analogous manner, the mutual admittance between two seismic source vibrators on the surface of the earth may be determined by rock properties and by their geometric relationship, i.e., by their separation distance. Miller and Pursey (1955) and Tan (1985) give analyses of mutual admittance for various geometrical relations between vibrators. For example, Miller and Pursey's (1955) equation (41) includes mutual admittance effects, observed as a double summation of Bessel functions, where the arguments of the Bessel functions include the geometric factors of spacing between vibrators. In other embodiments, equation (43) in Miller and Pursey (1955) may more directly represent mutual admittance as including the product of Bessel functions whose arguments incorporate spacings between vibrators. In either equations (41) or (43) it may be observed from sample cases for 1, 2, and 3 vibrators, that the energy may not be linearly proportional to the number of vibrators.

FIG. 1 depicts a plan view 100 of the geometry of a seismic receiver line 101 and a configuration of two seismic vibrators at various horizontal spacings orthogonal to the receiver line 101. The receiver line 101 may typically have a length 102 on the order of up to a kilometer or more. The receiver line 101 may be purposefully deployed for the measurements according to the present disclosure, or it may be a part of a deployment for a conventional 2D, 3D, 4D, or other seismic survey. The receiver line 101 may include a plurality of spaced apart seismic receivers 106, which may be, without limitation, single component particle motion sensors, multi-component particle motion sensors, pressure or pressure time gradient sensors or combinations of any of the foregoing. Signals generated by the sensors may be conducted to a recording unit 105 for recording and processing as will be further explained below.

Two seismic energy sources, for example, vibrators 110 in FIG. 1 may be deployed at a plurality of different horizontal spacings, indicated by lines at 103 along a source line 104 generally orthogonal to the receiver line 101. Vibrators may be any type known in the art for seismic surveying. For example, the vibrators 110 may be deployed at a first spacing 111; a second spacing 112, a third spacing 113; and/or a number of other spacings, at substantially regular intervals. The total number of spacings may vary from a few up to several dozens. The typical spacings will range from a few meters, up to several tens of meters, or up to a few hundreds of meters. The maximum spacing will typically be on the order of the longest seismic wavelengths expected, or preferably somewhat more than these wavelengths.

In an example embodiment, the receiver line 101 may be 2 kilometers long with receiver stations each 25 meters. The vibrator spacings 103 may range from 5 meters to 100 meters with an increment of 5 meters.

Those skilled in the art will understand that the linear superposition source array effect along the axis of the receiver line 101 would be observed to be that of a point source. In effect, for Fourier wavenumber linear superposition array analysis along the axis of the receiver line 101, the source positions at the various spacings 103 would all be projected onto a single point on the receiver line 101.

It is also noted that the plurality of source (vibrator) separation distances 103 are significantly less than the length 102 of the receiver line 101. Thus the travel paths and arrival times at each receiver station are only modestly dependent on the separation distances 103.

Figure 2:
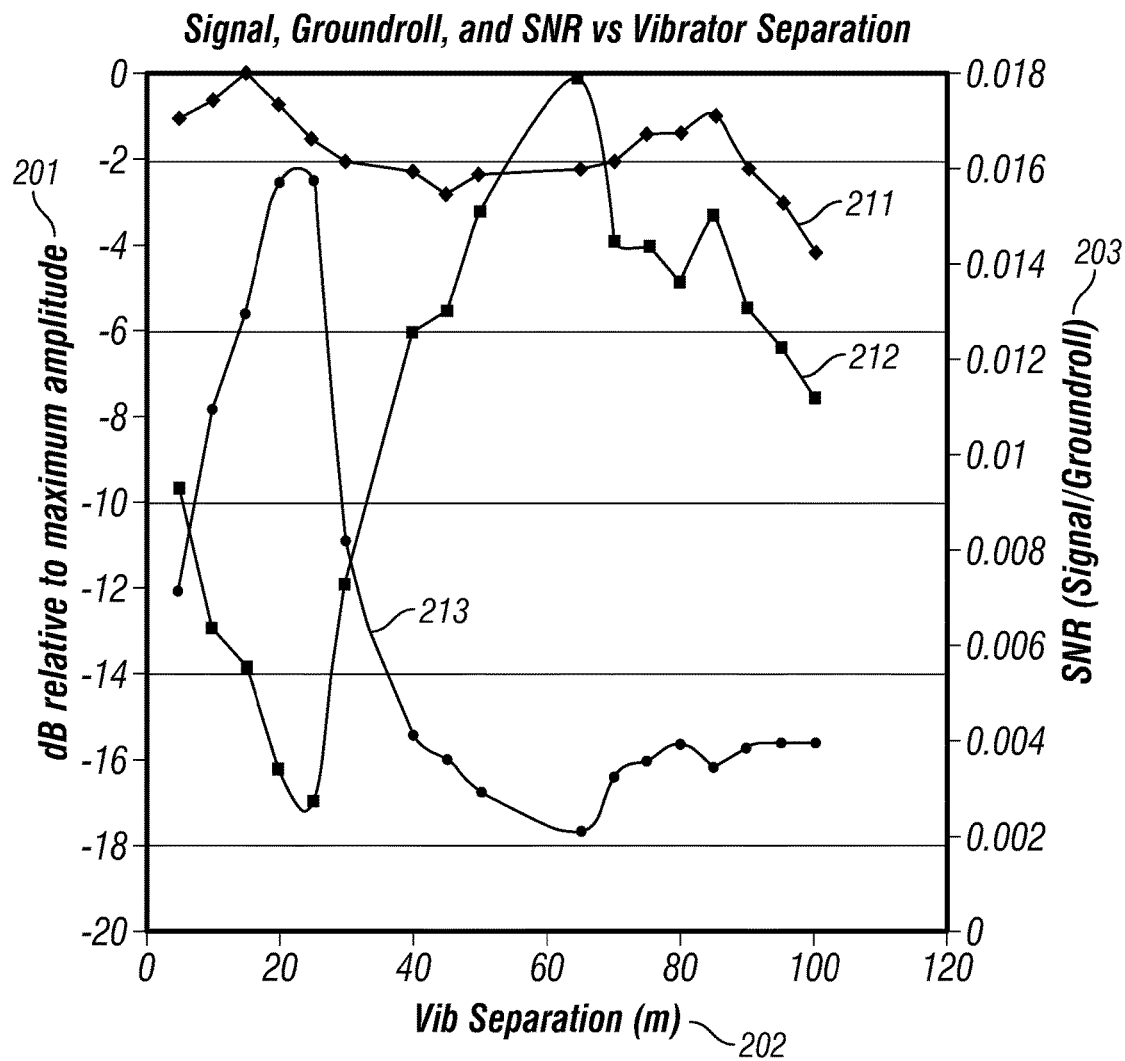
FIG. 2 is an example of the variation of the ratio of seismic reflection signal to source-generated-noise plotted vs. the horizontal spacing between two seismic vibrators utilizing the configuration of FIG. 1.

FIG. 2 shows an example data set recorded according to the geometry of FIG. 1. The horizontal axis is the separation distance between the vibrators, represented by the suite 103 in FIG. 1, including the example separations 111, 112, and 113 in FIG. 1, In FIG. 2, signal 211 is measured by summing energy within a fixed time window centered on reflected seismic compressional body wave, for each recording of a vibrator separation distance. In FIG. 2, ground roll 212 is measured by summing energy within a fixed time window centered on ground roll, for each recording of a vibrator separation distance. The signal-to-noise ratio, SNR, 213 is the ratio of the measured reflected signal energy vs. ground roll energy plotted for each vibrator separation distance 202. In FIG. 2, such energies are plotted using a decibel scale 201. The signal-to-noise ratio is plotted using a linear scale 203 depicted on the right side of the graph in FIG. 2. The plots are only shown in FIG. 2 to illustrate the results obtained by using a technique according to the present disclosure. It will be appreciated by those skilled in the art that such results may also be numerically generated and stored in a computer system (FIG. 3) and only an optimum spacing between sources may be displayed our otherwise output by the computer system.

In the particular example of FIG. 2, it is noted that the SNR has a well-defined peak at a vibrator spacing of about 20 to 25 meters. This peak depends on mutual admittance effects that vary with vibrator spacing. The geometry used is such that all the seismic data are recorded through the equivalent of an invariant linear superposition receiver array, and a point source array.

Linear superposition array theory as used prior to the present disclosure would indicate that there should not be any variation in either signal or ground roll observed in a plot such as FIG. 2 for the geometry of FIG. 1 for a homogeneous isotropic earth.

In some embodiments, three or more vibrators may be deployed along the seismic source line 104 in FIG. 1. In some embodiments, three or more vibrator units may be deployed with unequal spacings along the seismic source line 104 in FIG. 1.

In some examples, a plurality of different spacings may be selected to utilize mutual admittance effects at various selected bandwidths. The bandwidths may be, for example, temporal, frequency, wavelength, wavenumber and combinations of the foregoing.

In some embodiments, multiple vibrator units may be deployed in configurations that are not on the seismic source line 104 in FIG. 1, which line is orthogonal to the seismic receiver line 101 in FIG. 1. Rather, the multiple vibrator units may be co-linear along some other line, or may be non-co-linear.

In some embodiments, linear arrays of vibrators may be deployed in wide azimuth three dimensional ("3D") and four dimensional ("4D") seismic surveys. The concepts of mutual admittance, when used in the methods of the present disclosure may enable an optimum choice of vibrator spacing to suppress ground roll in directions generally orthogonal to the linear source array.

In some seismic surveys, when N vibrators are used individually in a slip-sweep, or simultaneous, or blended source 3D or 4D seismic survey, there is no linear superposition source array possible. In some embodiments, the vibrators may be reconfigured to N/2 source locations, each having a pair of vibrators, spaced at a distance as described in the present disclosure. In such embodiments, an overall reduction of ground roll may be made available.

In some embodiments impulsive seismic sources may be used instead of seismic vibrators. Mutual admittance concepts are applicable in a directly analogous manner. The use of impulsive seismic sources that are closely coordinated for the time of impulse is an enabling factor for these embodiments.

Figure 3:
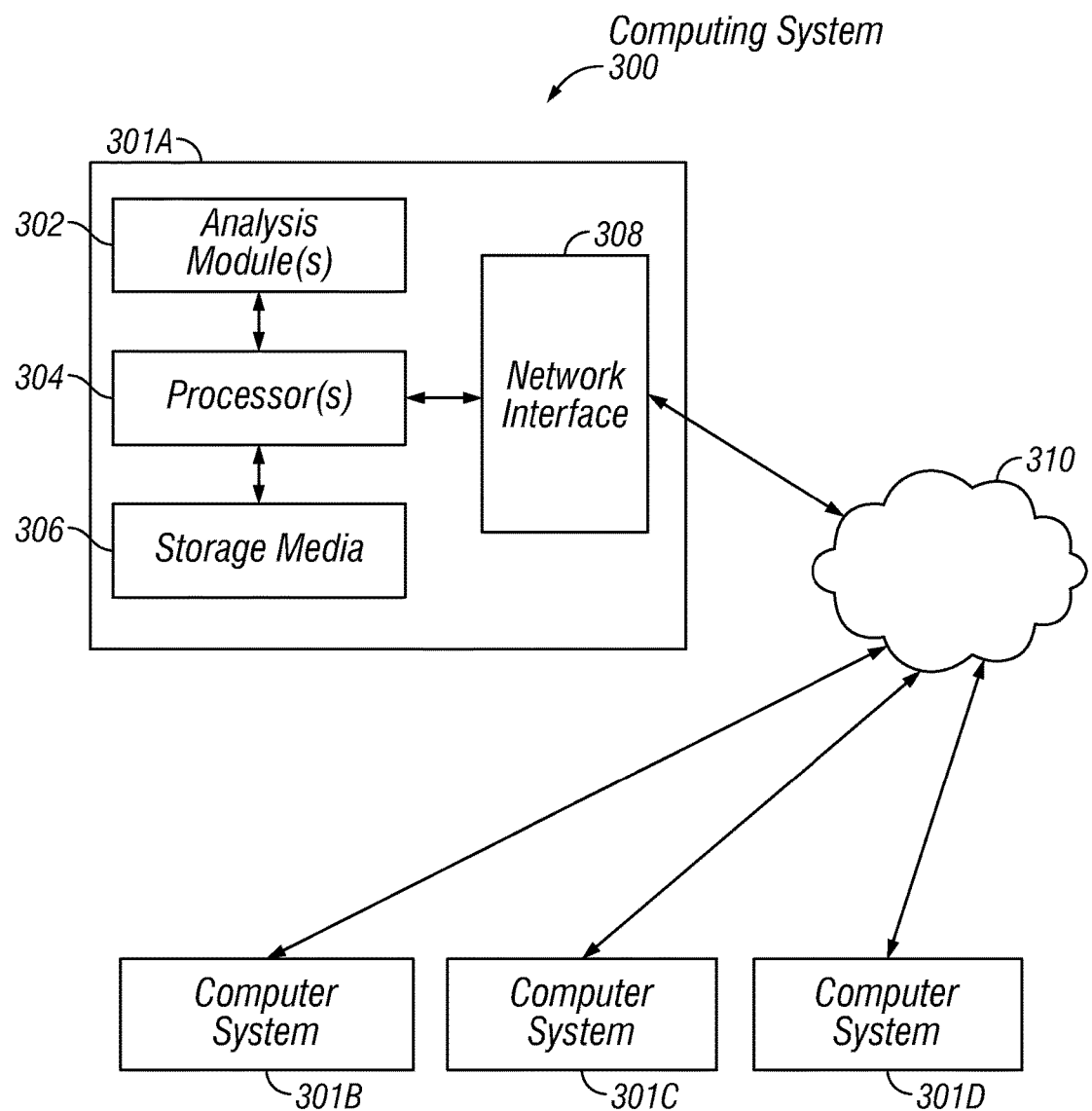
FIG. 3 shows an example computer system that may be used to process signals according to the present disclosure

FIG. 3 depicts an example computing system 300 in accordance with some embodiments. The computing system 300 may be an individual computer system 201A, such as may be disposed in the recording unit (105 in FIG. 1) or an arrangement of distributed computer systems. The computer system 301A may include one or more analysis modules 302 that may be configured to perform various tasks according to some embodiments, such as the tasks depicted in FIG. 1. To perform these various tasks, analysis module 302 may execute independently, or in coordination with, one or more processors 304, which may be connected to one or more storage media 306. The processor(s) 304 may also be connected to a network interface 308 to allow the computer system 301A to communicate over a data network 310 with one or more additional computer systems and/or computing systems, such as 301B, 301C, and/or 301D (note that computer systems 301B, 301C and/or 301D may or may not share the same architecture as computer system 301A, and may be located in different physical locations, for example, computer systems 301A and 301B may be at a well drilling location, while in communication with one or more computer systems such as 301C and/or 301D that may be located in one or more data centers on shore, aboard ships, and/or located in varying countries on different continents).

A processor can include a microprocessor, microcontroller, processor module or subsystem, programmable integrated circuit, programmable gate array, or another control or computing device.

The storage media 306 can be implemented as one or more computer-readable or machine-readable storage media. Note that while in the exemplary embodiment of FIG. 3 the storage media 306 are depicted as within computer system 301A, in some embodiments, the storage media 306 may be distributed within and/or across multiple internal and/or external enclosures of computing system 301A and/or additional computing systems. Storage media 306 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above may be provided on one computer-readable or machine-readable storage medium, or alternatively, can be provided on multiple computer-readable or machine-readable storage media distributed in a large system having possibly plural nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 300 is only one example of a computing system, and that computing system 300 may have more or fewer components than shown, may combine additional components not depicted in the example embodiment of FIG. 3, and/or computing system 300 may have a different configuration or arrangement of the components depicted in FIG. 3. The various components shown in FIG. 3 may be implemented in hardware, software, or a combination of both hardware and software, including one or more signal processing and/or application specific integrated circuits.

Further, the steps in the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

Non patent publications cited herein include the following:

Aki, K., and Richards, P., 2002, *Quantitative Seismology*, University Science Books.

Cassand, J. and Lavergne, M., 1971, *Seismic Emission by Vibrators, in Seismic Filtering*, Soc. of Exploration Geophysicists (originally in French, 1966)

Cordsen, A., et. al., 2008, *Planning Land 3-D Seismic Surveys*: Geophysical Developments No. 9, Society of Exploration Geophysicists Martin, J. and Jack, I, 1990, *The Behaviour of a Seismic Vibrator Using Different Phase Control Methods and Drive Levels*, First Break, vol. 8, no. 11, pp. 404-414, November, 1990.

Miller, G. F. and Pursey, H., 1954, *The Field and Radiation Impedance of Mechanical Radiators on the Free Surface of a Semi-Infinite Isotropic Solid*, Proceedings A of the Royal Soc, of London, vol. 233, pp. 521-541.

Miller, G. F. and Pursey, H., 1955, *On the Partition of Energy Between Elastic Waves in a Semi-Infinite Solid*, Proceedings A of Royal Soc. of London, vol. 233-234, pp. 55-69.

Postel, J, et. al., 2005, *Reduced Vibroseis Cycle Time Technique Increases Land crew Productivity*, First Break, vol. 23, pp. 37-40, Feburary, 2005.

Sallas, J., 1984, *Seismic Vibrator Control and the Down going P-Wave*, Geophysics, vol. 49, no. 6, pp. 732-740, June, 1984.

Sallas, J., and Weber, R., 1982, Comments on "The Amplitude and Phase Response of a Seismic Vibrator by W. E. Lerwill, Geoph. Prospecting, vol. 30, pp. 935-938.

Sanchez-Sesma, F., et. al., 2011, *Energy Partitions Among Elastic Waves for Dynamic Surface Loads in a Semi-Infinite Solid*, Bull. Seismological Soc. of America, vol. 101, no. 4, pp. 1704-1709, August, 2011.

Tan. T. H., 1985, *The Elastodynamic Field of N Interacting Vibrators (Two-Dimensional Theory)*, Geophysics, vol. 50, no. 8, pp. 1229-1252, August, 1985.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining an optimum spacing of seismic energy sources, comprising: (a) deploying a plurality of seismic energy sources along a source line, the seismic vibrators separated from each other at a selected spacing; (b) deploying seismic receivers along a receiver line orthogonally oriented to the source line; (c) simultaneously actuating each of the plurality of seismic energy sources while recording signals from the seismic receivers; (d) repeating (a) and (c) for a plurality of different spacings between the seismic energy sources; (e) calculating a seismic energy in the recorded signals in separate time windows selected to represent reflected body wave signal, and source generated ground roll noise, respectively; (f) calculating a signal-to-noise ratio with respect to the spacing of the seismic energy sources; and (g) selecting the optimum spacing between the seismic energy sources based on the signal-to-noise ratio; and (h) wherein the seismic energy sources have spacings therebetween selected to utilize mutual admittance effects at various selected bandwidths.

2. The method of claim 1, wherein two seismic energy sources are utilized.

3. The method of claim 1, wherein the seismic energy sources are at least one of vibrators and impulsive sources.

4. The method of claim 1 wherein a number of the seismic energy sources, N, are separated into N/n source arrays of a number, n, seismic energy sources in each source array, the source arrays spaced apart according to mutual admittance measurements; in slip-sweep, simultaneous source, or blended source 3D and 4D seismic surveys so as to reduce ground roll.

5. A method for determining an optimum spacing of seismic energy sources based on mutual admittance, comprising:
   (a) deploying multiple seismic energy sources along a source line at a selected spacing;
   (b) deploying seismic receivers along a receiver line orthogonally oriented to the source line;
   (c) simultaneously transmitting energy from each of the multiple seismic energy sources while recording signals from the seismic receivers;
   (d) repeating (a) and (c) for a plurality of different selected spacings between the seismic energy sources;
   (e) calculating a total seismic energy in the recorded signals in a time window selected to represent all source generated body waves and ground roll;

(f) calculating the total seismic energy with respect to the selected spacing between the seismic energy sources; and (g) selecting the optimal spacing between the seismic energy sources based on optimal total seismic energy in recognition of mutual admittance.

6. The method of claim 5, wherein two seismic energy sources are utilized.

7. The method of claim 5, wherein the seismic energy sources have spacings therebetween selected to utilize mutual admittance effects at various selected bandwidths.

8. The method of claim 5, wherein the seismic energy sources comprise at least one of vibrators and impulsive seismic sources.

9. The method of claim 5 wherein a number of the seismic energy sources, N, are separated into N/n source arrays of a number, n, seismic energy sources in each source array, the source arrays spaced apart according to mutual admittance measurements; in slip-sweep, simultaneous source, or blended source 3D and 4D seismic surveys so as to reduce ground roll.

10. A method for determining an optimum spacing of seismic energy sources, comprising:

(a) deploying a plurality of seismic energy sources in an arbitrary array with known positions and spacings;

(b) deploying seismic receivers in an arbitrary array with known positions and spacings;

(c) simultaneously transmitting energy each of the plurality of seismic energy sources while recording signals from the seismic receivers;

(d) repeating (a) and (c) for a plurality of different spacings between the seismic energy sources;

(e) calculating seismic energy in the recorded signals in separate time windows, the time windows selected to represent reflected body wave signal, and source generated ground roll noise, respectively;

(f) calculating a signal-to-noise with respect to the spacing between the seismic energy sources, representing the combined effect of linear arrays of energy sources and receivers along with mutual admittance effects;

(g) calculating a linear superposition array response for the energy sources in (a) and the receiver array of (b) herein for a selected temporal frequency spectrum with respect to the spacing between the seismic energy sources; and (h) selecting an optimum spacing between the seismic energy sources based on an optimum signal-to-noise ratio.

11. The method of claim 10, wherein two seismic energy sources are utilized.

12. The method of claim 10, wherein the plurality of seismic energy sources have spacings selected to utilize mutual admittance effects at various selected bandwidths.

13. The method of claim 10, wherein the seismic energy sources comprise at least one of vibrators and impulsive sources.

14. The method of claim 10 wherein a number of the seismic energy sources, N, are separated into N/n source arrays of a number, n, seismic energy sources in each source array, the source arrays spaced apart according to mutual admittance measurements; in slip-sweep, simultaneous source, or blended source 3D and 4D seismic surveys so as to reduce ground roll.

15. A method for determining an optimum spacing of seismic energy sources, comprising:

(a) deploying a plurality of seismic energy sources in an arbitrary array with known positions and spacing therebetween on the surface of the earth;

(b) deploying seismic receivers in an arbitrary array with known positions and spacings therebetween proximate the surface of the earth;

(c) simultaneously transmitting energy from each seismic energy source while recording signals from the seismic receivers;

(d) repeating (a) and (c) herein for a plurality of different spacings between the seismic energy sources;

(e) calculating a total seismic energy in the recorded signals in a time window selected to represent all source generated body waves and ground roll;

(f) calculating the total seismic energy in the recorded signals with respect to the spacing between the seismic energy sources, representing the combined effect of linear arrays of energy sources and receivers along with mutual admittance effects;

(g) calculating a linear superposition array response for the vibrator array of (a) and the receiver array of (b) herein for a selected temporal frequency spectrum with respect to the spacing between the seismic energy sources; and (h) selecting an optimal spacing between the seismic energy sources by comparison of the results of (f) and (g) herein, based on the optimal total seismic energy in recognition of mutual admittance effects.

16. The method of claim 15, wherein two seismic energy sources are utilized.

17. The method of claim 15, wherein the seismic energy sources have a plurality of different spacings selected to utilize mutual admittance effects at various selected bandwidths.

18. The method of claim 15, wherein the seismic energy sources comprise at least one of vibrators and impulsive sources.

19. The method of claim 15 wherein a number of the seismic energy sources, N, are separated into N/n source arrays of a number, n, seismic energy sources in each source array, the source arrays spaced apart according to mutual admittance measurements; in slip-sweep, simultaneous source, or blended source 3D and 4D seismic surveys so as to reduce ground roll.

* * * * *